United States Patent [19]

Walter

[11] Patent Number: 5,068,034

[45] Date of Patent: Nov. 26, 1991

[54] PURIFICATION UNDERDRAIN WITH MEANS TO COMPENSATE FOR FLOW AND PRESSURE DIFFERENCES BETWEEN LATERALS

[75] Inventor: Thomas P. Walter, Dallas, Pa.

[73] Assignee: Unilift Corporation, Wilkes Barre, Pa.

[21] Appl. No.: 518,687

[22] Filed: May 3, 1990

[51] Int. Cl.[5] ............................................. B01D 24/46
[52] U.S. Cl. .................................... 210/232; 210/274; 210/275; 210/279; 210/293; 210/504; 210/232; 210/410; 210/408; 210/411
[58] Field of Search ............... 210/274, 275, 279, 289, 210/291, 293, 504, 232, 410, 408, 411

[56] References Cited

U.S. PATENT DOCUMENTS

| | | | |
|---|---|---|---|
| 801,810 | 10/1905 | Parmalee | 210/274 |
| 879,876 | 2/1908 | Jones et al. | 210/274 |
| 2,710,692 | 6/1955 | Kegel et al. | 210/293 |
| 3,110,667 | 11/1963 | Stuppy | 210/293 |
| 3,648,731 | 3/1972 | de Boerr | 210/293 |
| 4,065,391 | 12/1977 | Farabaugh | 210/274 |
| 4,191,652 | 3/1980 | Whitmore | 210/275 |
| 4,214,992 | 7/1980 | Sasano et al. | 210/274 |
| 4,415,613 | 11/1983 | Medney | 210/504 |
| 4,476,020 | 10/1984 | Cheetham | 210/293 |
| 4,604,197 | 8/1986 | Louboutin et al. | 210/293 |
| 5,019,259 | 5/1991 | Hambley | 210/293 |

Primary Examiner—Robert A. Dawson
Assistant Examiner—Joseph Drodge
Attorney, Agent, or Firm—Caesar, Revise, Bernstein, Cohen & Pokotilow, Ltd.

[57] ABSTRACT

An underdrain lateral for a liquid purification system is described. The lateral has three chambers, a primary chamber, a compensating chamber, and gas chamber. Turbulence is minimized during cleansing of the purification media by isolating the gas from the liquid and the backwash liquid. This is accomplished by feeding gas into the gas chamber so that the chamber is occupied by gas only during cleansing. Orifices in the wall between the primary and compensating chambers and in the baffle between the compensating and gas chambers provide compensation for even distribution of liquid in the lateral. The design also enables the use of cut out in the gas chambers to equalize gas pressures and flow among the laterals and throughout the system bed and cut outs in the primary chambers to equalize liquid pressure and flow along the laterals and throughout the system bed. Nozzles with threaded stems having gas inlet orifices may be used and the levels of the entrances to the nozzles adjusted by rotating the stems to equalize backwash liquid flow among the nozzles. To minimize liquid pressure for greater gas flow during cleansing, an insert in the stem, adjacent the gas inlet orifices, may be added.

65 Claims, 5 Drawing Sheets

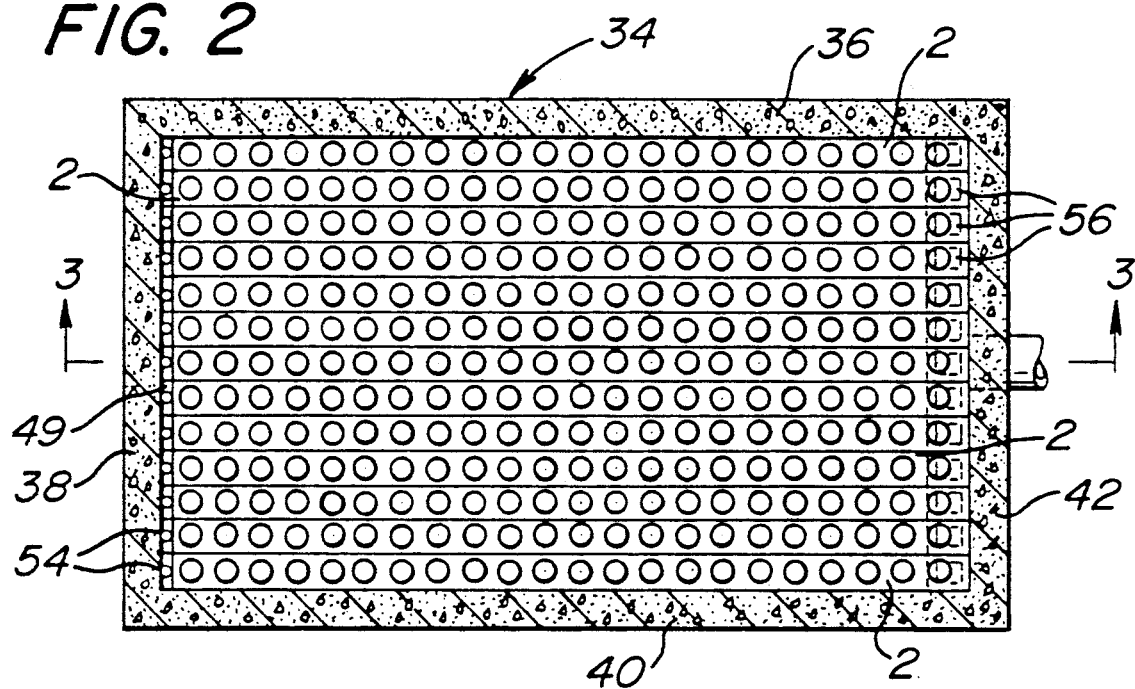
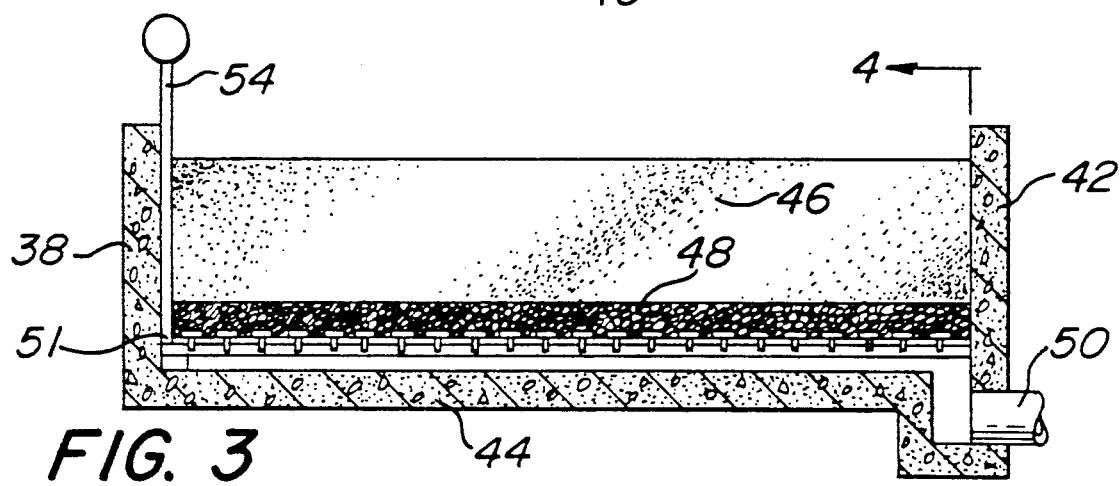
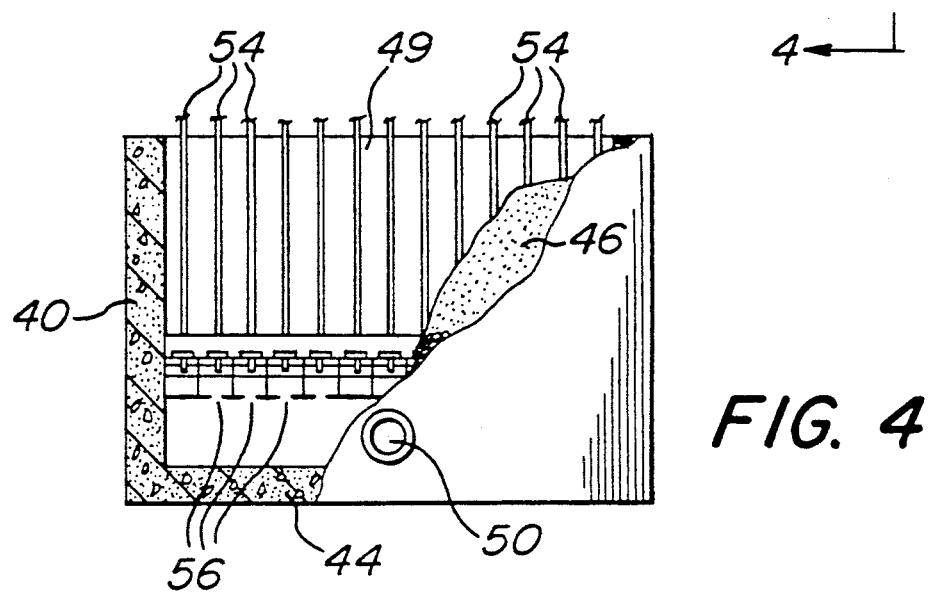

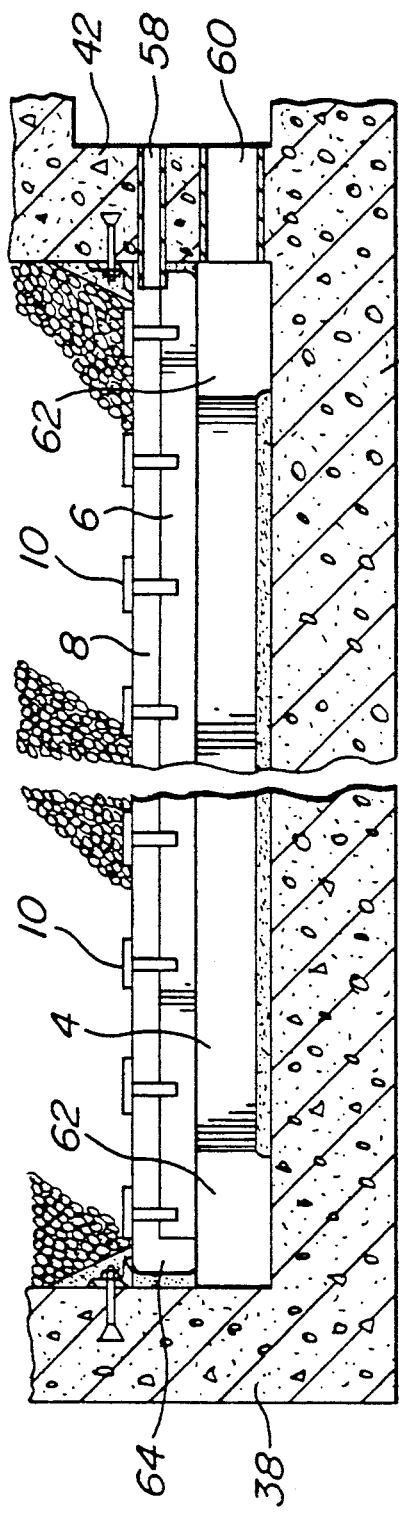
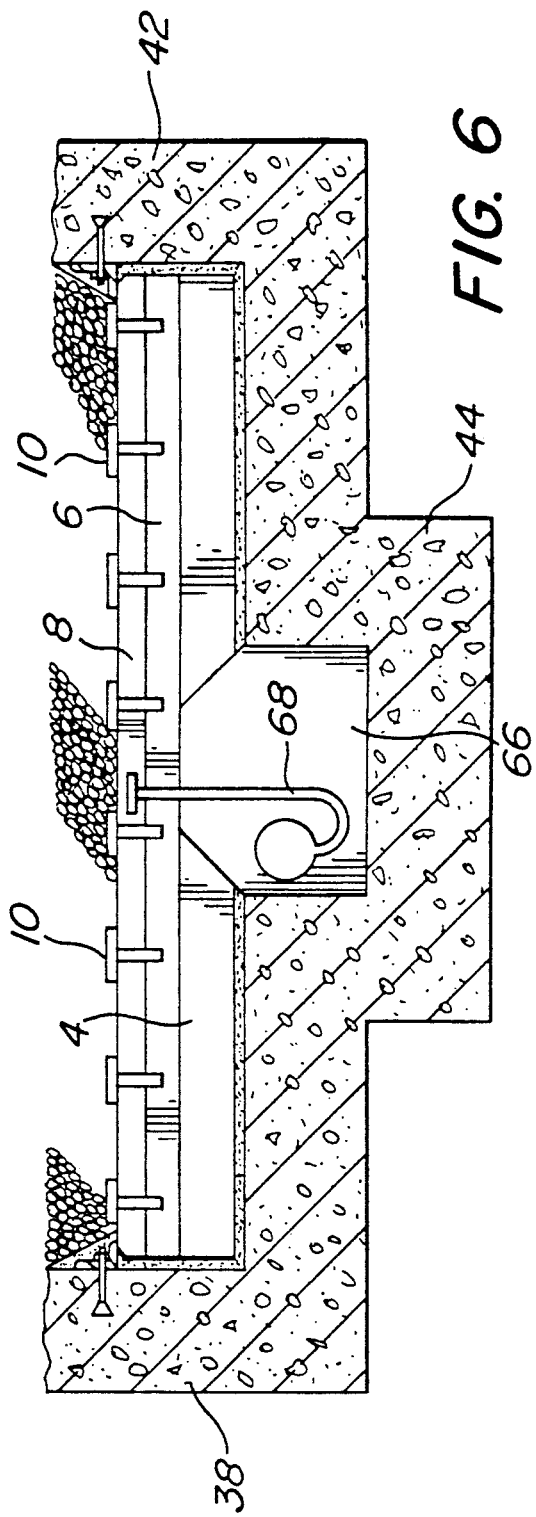

PURIFICATION UNDERDRAIN WITH MEANS TO COMPENSATE FOR FLOW AND PRESSURE DIFFERENCES BETWEEN LATERALS

BACKGROUND OF THE INVENTION

This invention relates generally to collecting and distributing apparatus or underdrains which are part of liquid purification systems.

One method of purifying liquid uses filtration systems with filter beds having one or more layers of material. The top layer consists of a granular media which is made up of fine particulate matter such as anthracite, sand, carbon, or garnet. The next level below the granular filtration media comprises support or packing gravel. Underdrain laterals are placed below the layer of gravel. These are long narrow channels which are laid laterally across the width or length of the filter bed. A plurality of such underdrain laterals are placed side by side, so that the entire lower portion of the filter bed beneath the gravel layer is composed of the laterals.

The liquid to be filtered is applied across the top of the granular layer. As it seeps through the granular layer, waste material removed from the liquid accumulates and adheres to the particles of the granular layer. The liquid then flows through the granular layer through openings in the top of the underdrain laterals and then through a flume beneath the underdrain, through which the filtered liquid is discharged.

To maintain the efficiency of the filtering system, it is necessary to periodically clean the waste material from the granular and gravel layers. This is accomplished by the use of backwash water, which flows in the reverse direction through the filtration system. The backwash water is introduced at the flume beneath the underdrain. It flows upward through the underdrain into and through the gravel layer and the granular layer, from whence it is discharged.

In order to make the backwash process more efficient, a gas such as air is often used. The purpose of the gas is to sufficiently agitate the gravel and granular material to loosen and free waste material which has adhered during the filtering process. During the gas cycle, a water level slightly above the top of the granular level is maintained. After and or during the gas cleansing cycle, the backwash water is introduced to remove the waste material which has been loosened and freed by the gas.

Two approaches are used with regard to the cleansing of the filter media. In one approach, the gas cycle is used first and immediately followed by a cycle during which backwash water alone is used. Another approach is to use the gas cycle first and immediately follow with a cycle during which both gas and backwash water are introduced and flow through the filtration system simultaneously.

The use of the combined cycle of gas and backwash water is more efficient since the amount of water required is drastically reduced as compared to the backwash water required with a second cycle of backwash water only. Furthermore, the combination of gas and water for the second cycle provides a more efficient cleaning operation during the use of water alone. However, when the granular material is very fine, the combined cycle cannot be used because some granular material is carried away by the gas bubbles in the backwash water and lost.

A typical operation might be the use of gas only in the order of 3-5 standard cubic feet per minute per square foot of the filter bed 2-5 minutes. Then the gas at 2-5 standard cubic feet per square foot per minute is mixed with water at 5-7¼ gallons per minute per square foot for 2-5 minutes. If the second cycle is backwash water only, up to 30 gallons per minute per square foot 3-5 minutes might be required depending on the filtration media.

The filter bottom of M. L. Stuppy, U.S. Pat. No. 3,110,667 specifies a block with two lower chambers alongside each other and two upper chambers, each one above a lower chamber. Ports between the lower chamber and the upper chamber provide compensation which assist in evening out the pressure distribution of the backwash water and lowering the amount of head pressure required. Stuppy however, does not provide for insertion of gas such as air to assist in the backwash process. The only way that gas can be applied in the backwash process in Stuppy is to add a network of pipes to supply gas above the granular material level, which would be prohibitively expensive, or to add a network of pipes above the underdrain which would disturb the granular material and cause it to mix with the gravel. The finer granules could then clog the ports at the underdrain and seep into the underdrain. Maldistribution of granular material across the filter bed could also result.

Farabaugh, U.S. Pat. No. 4,065,391, discloses an underdrain which provides for the use of the gas for cleansing. Chambers are formed by diagonal walls. This results in alternate chambers that mix gas and water and chambers that carry water only, with compensating orifices in the diagonal walls.

Sassano et al., U.S. Pat. No. 4,214,992 specifies a block with an air and water chamber in the center and water dispensing chambers on both sides. The chambers are formed with diagonal and straight walls and are rhombic in shape.

A major problem with the underdrains of Farabaugh and Sassano is that when the gas and water mix in the chamber during the gas cycle, turbulence is often set up which creates standing waves which can become destructive. The turbulence often result in the mixing of the granular particles with the gravel, (six layers of gravel are required with Farrabaugh and Sassano underdrains), and the seepage of granular particles into the chambers which clog the orifices on the top of the underdrain and in the diagonal walls of the underdrain.

If the turbulence becomes severe enough, catastrophic damage can occur and has occurred, causing poor distribution of water and gas, damage to and breaking up of the underdrain, and lifting of the underdrain blocks or laterals off the filter bed floor.

Furthermore, it is not possible to connect the gas chambers from one underdrain lateral to another with cutouts to equalize the gas distribution. It is also not possible with the underdrains of Farabaugh and Sassano to interconnect with cutouts the water chambers from one underdrain lateral to another to equalize water distribution.

OBJECTS OF THE INVENTION

Accordingly, it is the general object of the instant invention to provide an underdrain for liquid purification systems which overcomes the shortcomings of present structures.

It is a further object of the instant invention to provide an underdrain for liquid purification systems which provides for a minimal amount of turbulence in the water during the gas cleansing cycle and the combined gas and backwash water cycle.

It is still a further object of the instant invention to provide an underdrain for liquid purification systems which allows for cutout means for equalizing gas and water pressures and distribution between the parallel units of the underdrain laterals.

It is still yet a further object of the instant invention to provide an underdrain for liquid purification systems which comprises a primary chamber, a compensating chamber, and a separate gas chamber.

It is another object of the instant invention to provide underdrain for liquid purification systems which allows for easy manual adjustment of the level of the ports for the entry of backwash water to flow out of the underdrain, in order to equalize the water pressure at each port and to equalize the distribution of the backwash water.

It is still another object of the instant invention to provide an underdrain for liquid purification systems which minimizes the required depth of the gravel layer.

It is still yet another object of the instant invention to provide an underdrain for liquid purification systems which prevents the clogging of the input ports to the underdrain and the compensating orifices between the chambers of the underdrain with granular material.

It is still an additional object of the instant invention to provide an underdrain for liquid purification systems which is inexpensive to manufacture and is easy to install and maintain.

SUMMARY OF THE INVENTION

These and other objects of the instant invention are achieved by providing an underdrain comprised of laterals which have three chambers; a lower chamber or primary chamber, a middle chamber or compensating chamber, and a top gas chamber. Compensating orifices are placed in the separator wall between the compensating and primary chamber and in a horizontal baffle which defines the top of the compensating chamber and the bottom of the gas chamber. These compensating orifices and the horizontal baffle tend to equalize gas and water pressures during cleansing operations and to prevent turbulence or the creation of destructive standing waves during backwash.

A series of nozzle assemblies are placed in the top wall of the underdrain lateral along its length. Filtered water flows through distribution orifices in the top of the nozzle assembly through a threaded stem into the compensating chamber, to the primary chamber and through a flume from which it is discharged.

Parallel runs of the laterals comprising the chambers and nozzles assemblies are installed under the gravel layer. There are various types of gas and water distribution systems known to those familiar with the art. The instant invention may be used with front flume designs, wall sleeve designs and center flume designs, depending upon the size of the filter bed and other factors in the design and installation. Furthermore, the underdrain design of the instant invention allows for cutouts in each lateral between the parallel underdrain blocks which connect the primary chambers together to equalize water pressure, distribution and flow and which connect the gas chambers together to equalize gas pressures and flow.

DESCRIPTION OF THE DRAWING

Other objects of many of intended advantages of this invention will be readily appreciated when the same becomes better understood by reference to the following detailed description when considered in connection with the accompanying drawings wherein:

FIG. 2 is a plan view of the underdrain showing the top of the underdrain laterals and the nozzle assemblies of the underdrain.

FIG. 3 is a vertical cross-sectional view of the filtering system which shows the granular media and gravel packing levels and the underdrain laterals taken along the line 3—3 of FIG. 2.

FIG. 4 is a partial, cross-sectional view taken along the line 4—4 of FIG. 3 which shows the gas inlet pipes for a front flume distribution system.

FIG. 5 is a cross-sectional view of a filter bed using a wall sleeve distribution system.

FIG. 6 is a cross-sectional view of a filter bed using a center flume distribution system.

DETAILED DESCRIPTION OF THE PREFERRED EMBODIMENTS

Figure 1:
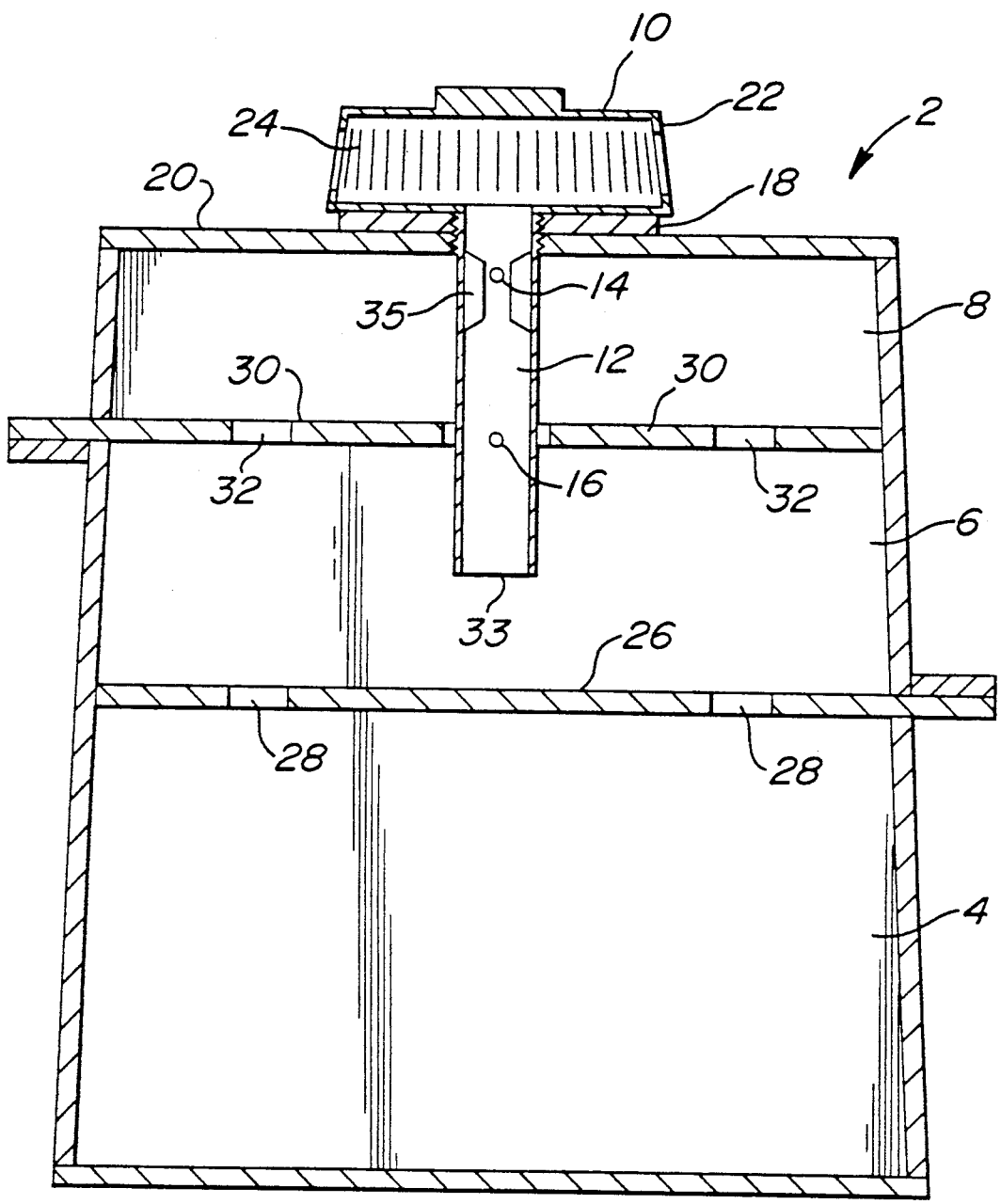
FIG. 1 is a cross-sectional view of an underdrain lateral installed at the bottom of the filtering system.

Referring now in greater detail to the various figures of the drawing, wherein like reference characters refer to like parts, there is shown in FIG. 1 a vertical cross sectional view of an underdrain lateral 2 of the present invention. As shown in FIG. 1, the underdrain lateral 2 comprises a lower, primary chamber 4, a middle, compensating chamber 6 and an upper, gas chamber 8. Nozzle assembly 10 has a threaded stem 12 with orifices 14 and 16 for gas input into the filter bed during cleansing.

The nozzle assembly 10 is located on a spacer 18 which is positioned on top wall 20 of the underdrain lateral 2. The inner surfaces of the spacer 18 and the top wall 20 formed by a hole for placement of the cylindrical stem 12, are threaded to accept the threads at the top of the threaded stem 12. Distribution orifices 24 are placed in upper member 22 of the nozzle assembly 10. The distribution orifices 24 are made small to prevent passage of any granular material which has settled into the gravel packing level during filtering and during cleansing.

Formed in the separator wall 26, which defines the top of the primary chamber 4 and the bottom of the compensating chamber 6 are compensating orifices 28 which equalize water distribution and pressures during the filtering and the gas and backwash cycles. A horizontal baffle 30 separates the compensating chamber 6 from the gas chamber 8. The horizontal baffle 30 contains orifices 32 which equalize gas and water pressure during the filtering and the gas and backwash cycles.

As will be described in detail later, during filtering of waste water, the water flows through the granular media level and then through the gravel packing level as shown in FIG. 3, through distribution orifices 24 and into the threaded stem 12. The waste water then flows through orifices 28 and then out through a liquid flume from which it is discharged.

During backwash water is forced back into the system first through the primary chamber 4 then into the compensating chamber 6 and out through the threaded stem 12. It then flows through the distribution orifices 24 into the gravel layer and upward into and through granular layer from whence it is conducted out of the filtering system and discharged.

For greater cleansing efficiency a gas is introduced into the gas chamber 8. The gas flows through orifices 14 and 16 into threaded stem 12 and out of the distribution orifices 24 through the gravel layer and then through the granular layer. The gas bubbles formed agitate the granular material so as to loosen accumulated waste material which was formed during the filtering cycle.

After the gas cycle, a backwash cycle is initiated so that backwash water flows through the gravel and media layers removing and carrying away the waste material which was loosened during the gas cycle. As described previously, it is more efficient to follow the gas cycle with a combined gas and backwash water cycle then to follow the gas cycle with a backwash cycle only. However, a combined cycle cannot be used when the granular media is very fine since the granular material would be carried away in the gas bubbles by the backwash water.

During the gas cycle, a water level above the granular level is maintained. The gas entering the gas chamber 8 forces the water in the underdrain downward until the level of the water is slightly below the top of the compensating chamber 6. Water enters at the opening at the bottom of the cylindrical threaded stem 12 and gas enters the threaded stem 12 through the orifices 14 and 16. The gas and water then go through the distribution orifices 24 and then rise through the gravel and granular levels from whence they are discharged. This process loosens and removes the waste material which has accumulated on the granular particles.

After the gas cycle which was described above, a cycle of backwash water or a combined cycle of backwash water and gas may be used to clear away the waste material which has been loosened during the gas cycle.

The underdrain prevents turbulence during the gas and backwash water cycles as compared to underdrains in present use. With the water level in the compensating chamber 6 just below the horizontal baffle 30, the amplitude of standing waves is reduced and water turbulence does not occur as in existing devices. Furthermore, the threaded portion of the stem 12 enables, during installation and maintenance, the setting of the entrances 33 of the various stems 12 to exact levels above the underdrain floor to assure that the water pressure and flow entering the various stems 12 are equalized throughout the entire filtering system. Also by placing all stems at the same level, the orifices 14 and 16 are positioned for even gas pressure and flow in the filtering system.

The inside diameter of threaded stem 12 may be reduced by inserts 35 placed near the orifice 14 to reduce pressure during backwash allowing greater gas flow through the orifice 14.

FIG. 2 shows a plan view of the underdrain laterals 2. Each underdrain lateral 2 extends laterally across the width or length of filter bed 34. The array of the nozzle assemblies 10 are shown in the view. At the left are the gas inlet pipes 54 which feed gas into each of the underdrain units 2. The filter bed 34 comprises side walls 36, 38, 40 and 42. Shown dotted on the right hand side of FIG. 2 are cutouts 56 which connect the primary chambers 4 of the underdrain laterals 2 together to equalize water flow and pressure in the underdrain.

FIG. 3 shows a vertical cross section of the filtering system along the line 3—3 of FIG. 2. As can be seen in FIG. 3 a layer of granular material 46 is placed above a layer of gravel 48. The underdrain laterals 2 cover the bottom 44 of the filtering bed 34 beneath the gravel layer 48. Gas inlet pipes 54 are placed in gas distribution chamber 49 for feeding gas into each of the gas chambers 8 of the underdrain laterals 2. Cutouts 51 at the end of each of the underdrain laterals 2 connect the gas chambers 8 to equalize gas pressure and allow an equal flow of gas throughout all the gas chambers 8.

Below the underdrain laterals 2 is a liquid flume 50 through which the filtered water exits and into which backwash water flows during the backwash cycle.

The gas inlet pipes 54 are placed at the front of the filter bed 34 are shown in FIG. 4, which is a partial cross sectional view taken along the line 4—4 of FIG. 3. As can be seen in FIG. 4 cut outs 56 in the bottom of the primary chambers 4 at each end of each underdrain blocks 2 provide for equalization of water pressure and water flow throughout the underdrain.

As is well know to those skilled in the art, various arrangements with regard to water and gas distribution are in common use. The arrangement shown in FIGS. 2, 3, and 4 is a front flume design. In addition to the front flume design, water and gas distribution can be achieved through a wall sleeve design as shown in FIG. 5 or through a center flume design as shown in FIG. 6. The choice of distribution design depends upon the size of the filtering system, the amount of water to be filtered, and various other considerations with regard to any specific installation. However, the instant invention is applicable to all such arrangements.

A wall sleeve water and gas distribution system with the present invention is shown in FIG. 5. Both gas inlet pipes 58 and liquid flume 60 are in placed in side wall 42. Cutout 62, at both ends of underdrain lateral 2 connect the primary chambers 4 of each lateral 2 together to assure equal distribution of water pressure and flow throughout the underdrain. Similarly, the gas chambers 8 of the underdrain laterals 2 are connected together at one end of the laterals 2 by cutouts 64 which equalizes gas pressure and flow throughout the underdrain.

FIG. 6 shows a center flume gas and water distribution system. Liquid flume 66 is shown centered in bottom wall 44. Gas distribution also takes place centrally. The gas enters into the gas chambers 8 via J tube 68. Cutouts (not shown) may also be used to equalize water and gas pressures and flow.

Figure 7:
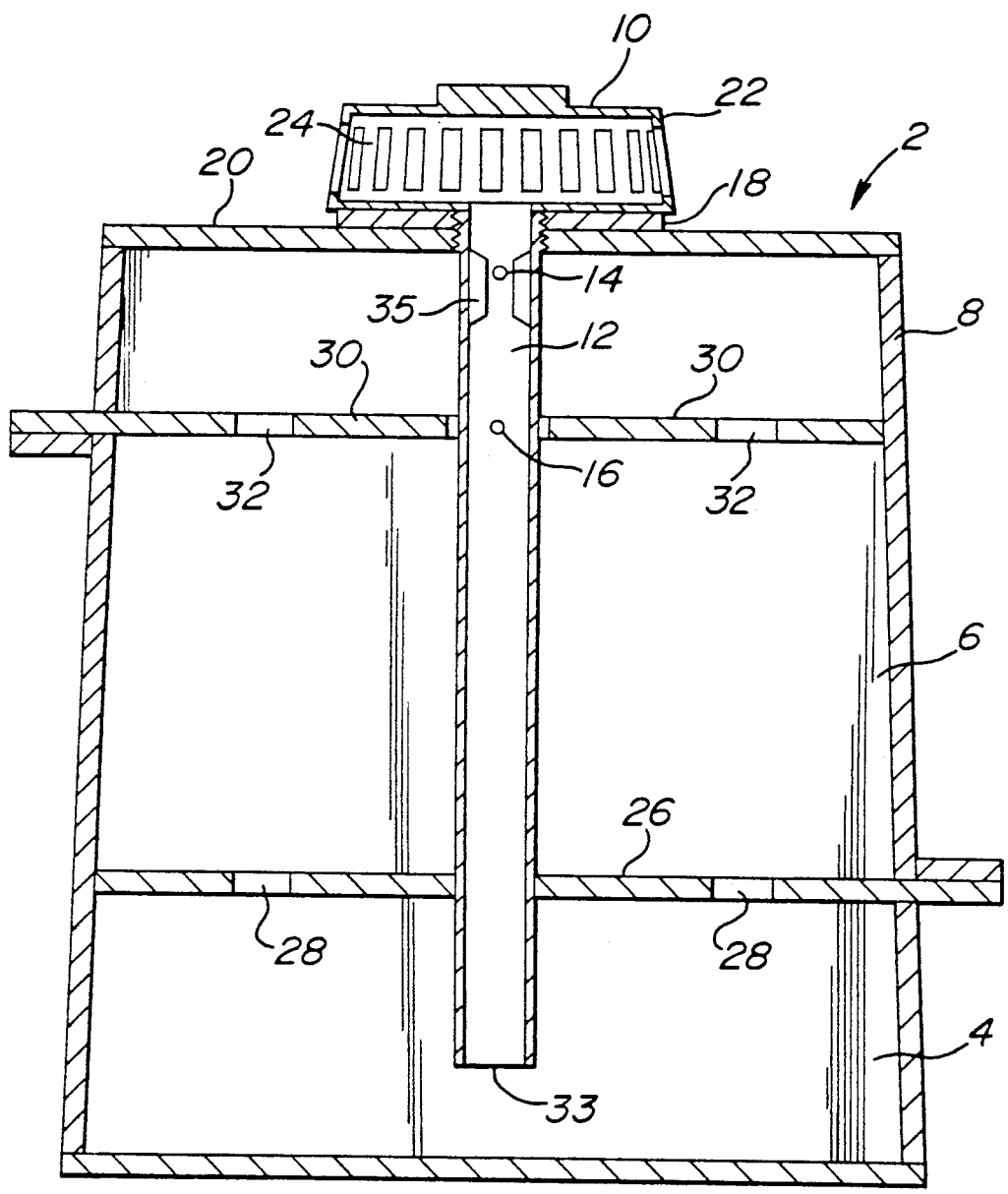
FIG. 7 is a cross-sectional view of the underdrain lateral of the alternative embodiment.
Figure 8:
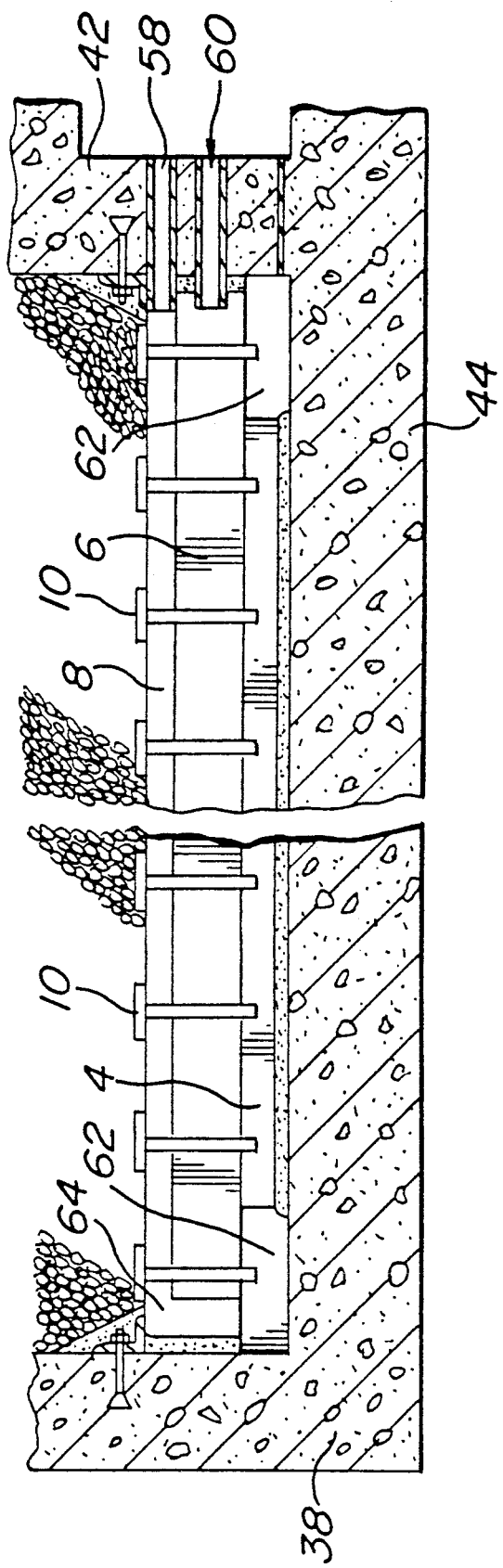
FIG. 8 is a cross-sectional view of a filter bed using a wall sleeve distribution system with the alternative embodiment.

An alternative embodiment of the invention is shown in FIGS. 7 and 8. In this embodiment, the distribution orifices 24 in the upper member 22 of the nozzle assembly 10 are made larger. The dimensions of the distribution orifices 24 of the alternative embodiment are ¼ inch wide by inch long as compared to 1/32 inch wide by 1 inch long in the first embodiment. Also as can be seen in FIGS. 7 and 8, the threaded stem 12 is made longer so that entrance 33 is in the lower chamber 4. In addition, the middle chamber 6 is made longer and the lower chamber 4 is shortened.

Also in this alternative embodiment, the functions of the chambers 4 and 6 are reversed. Chamber 6 is the primary chamber into which the backwash water is inserted. The lower chamber 4 is now the compensating chamber.

FIG. 8 is a cross-sectional view of a filter bed with a wall sleeve distribution system using the alternative embodiment. As can be seen in FIG. 8, backwash water enters through liquid flume 60 into the middle primary chamber. The upper chamber 8 remains the gas chamber as in the first embodiment and gas enters through gas inlet pipes 58.

The alternative embodiment is intended to guard against the possibility that after about five years of service, waste material might clog the openings of the distribution orifices 24. The orifices 24 are therefore made wider. This necessitates three to four layers of the gravel 48 beneath the granular material 46. The larger size gravel is placed in the lower layer with each higher layer being successively of smaller size with the smallest size gravel in the top layer, beneath the granular layer. In the first embodiment, on the other hand, only one gravel layer is required because smaller size gravel can be used abutting the nozzle assembly 10, because the openings of the distribution orifices 24 are much narrower.

With this system it is possible that large gulps of air entering with the backwash water could lift the finer gravel which could be washed out when the backwash water is discharged. Therefore, the threaded stem 12 made longer so that the entrance 33 was considerably below the backwash intake into the middle chamber 6 to prevent air from entering into the threaded stem 12 and thence through the distribution orifices 24 rising up through the gravel layers.

An underdrain system which provides for several clear and important advantages over the previous and current art has been described. These include the use of a gas cleansing cycle and a backwash liquid cycle or a combined gas and backwash liquid cycle wherein turbulence in the liquid is minimized. Existing systems often create sufficient turbulence to result in the mixing of the granular media with the gravel, causing clogging of orifices which jams the system. Furthermore, the disturbances are sometimes severe enough to cause catastrophic results such as the lifting or breaking up of the laterals of the underdrain.

The reduction in turbulence during the cleansing cycles allows for the reduction of the amount of granular media required as less mixing between the granular and gravel layers occurs as well as less shifting of granular materials causing unequal amounts of material at various locations in the filter bed. While the systems in common use today require six layers of gravel, the first embodiment of this invention requires only one layer of gravel, while the second embodiment requires only three or four layers of gravel.

The underdrain laterals 2 may be composed of ceramic, fiber glass, plastic, metal or any other suitable material.

The instant invention also provides an easy means for leveling the backwash liquid intakes to provide for even liquid distribution by rotating the threaded stems of the nozzles. Also, through the use of cut outs in the underdrain laterals 2, gas and liquid pressures and flow are equalized within each of the underdrain laterals and throughout the filter bed 34.

Although the embodiments described herein use filtration to purify waste water it should be noted that the instant invention is equally applicable to other methods of purification and to purify liquids other than waste water.

Without further elaboration, the foregoing will so fully illustrate my invention that others may, by applying current or future knowledge, readily adapt the same for use under the various conditions of service.

I claim:

1. A liquid purification system comprising:
   (a) a bed into which a liquid to be purified flows;
   (b) a liquid purification media located in said bed;
   (c) an underdrain placed in said bed beneath said purification media, said underdrain comprising a plurality of underdrain laterals laid laterally in said bed, each of said plurality of laterals being parallel and each of said laterals comprising:
      (1) a gas chamber defined by surrounding walls;
      (2) a means to cleanse said purification media during cleansing period using gas and backwash liquid introduced into said underdrain;
      (3) a means to isolate said gas by from said backwash liquid and provide that only said gas occupies each of said gas chambers during said cleansing periods, said isolating means comprising each of said gas chambers and a means for injecting gas into each of said gas chambers;
      (4) a means to compensate for differences in liquid pressures and flow during purification periods and said cleansing periods between said laterals and to equalize liquid distribution between said laterals.

2. A liquid purification system comprising:
   (a) a bed into which a liquid to be purified flows;
   (b) a liquid purification media located in said bed which purifies liquid during purification periods;
   (c) an underdrain placed in said bed beneath said purification media, said underdrain comprising a plurality of underdrain laterals laid laterally in said bed, each of said plurality of laterals being parallel, each of said laterals comprising:
      (1) a means to cleanse said purification media during cleansing periods using gas and backwash liquid introduced into said underdrain;
      (2) a means to isolate said gas from said liquid and said backwash liquid when said gas is introduced into said underdrain, and allow said gas only to occupy a portion of said underdrain during said cleansing periods;
      (3) a means to compensate for differences in said liquid pressures and flow during said purification periods and during said cleansing period between said laterals; and
      (4) a lower primary chamber, a middle compensating chamber above said lower primary chamber and an upper gas chamber above said compensating chamber, and said means to isolate said gas from said liquid and backwash liquid comprises each of said gas chambers into which said gas is introduced during cleansing of said purification media, with said gas chamber occupied only with gas during said cleansing periods.

3. The system of claim 2 wherein said means to cleanse said purification media comprises a means to introduce said gas into each of said gas chambers of to loosen impure matter adhering to said purification media as a result of said purification and a means to introduce said backwash liquid into each of said primary chambers to remove said impure matter from said bed.

4. The system of claim 3 wherein said means to introduce gas into said gas chambers comprises at least one gas inlet pipe and said means to introduce said backwash liquid into said primary chambers comprising a liquid flume.

5. The system of claim 2 wherein each of said plurality of underdrain laterals comprises a separator wall between each of said primary chambers and a respective one of said compensating chambers and said means to compensate for differences in liquid pressures and flow during purification and cleansing comprises orifices in each of said separator walls.

6. The system of claim 2 wherein said system comprises a means to minimize liquid turbulence during said cleansing periods of said purification media.

7. The system of claim 6 wherein each of said plurality of underdrain laterals comprises a horizontal baffle between each of said compensating chambers and a respective one of said gas chambers, and said means to minimize liquid turbulence comprises each of said baffles, each of said baffles being positioned a predetermined distance above the interface between said gas and liquid during cleansing of said purification media to minimize liquid standing waves and turbulence during said cleansing periods.

8. The system of claim 7 wherein said each of said baffles has orifices therein to compensate for differences in liquid pressures and flows during purification and during cleansing.

9. The system of claim 2 wherein said system comprises a means to equalize liquid distribution and backwash liquid distribution in said underdrain.

10. The system of claim 9 wherein said means to equalize liquid distribution and backwash liquid distribution comprises at least one cutout in each of said primary chambers allowing said liquids to flow between said primary chambers.

11. The system of claim 10 wherein said system comprises a means to equalize gas distribution in said underdrain.

12. The system of claim 11 wherein said means to equalize gas distribution in said underdrain comprises cutouts in each of said gas chambers allowing said gas to flow between said gas chambers.

13. The system of claim 2 wherein each of said plurality of underdrain laterals comprises a top wall with a plurality of openings through which said liquid flows during purification and through which said gas and backwash liquid flow during cleansing.

14. The system of claim 13 wherein each of said plurality of underdrains comprises a plurality of nozzle assemblies, each of said plurality of nozzle assemblies being positioned in a respective one of said plurality of openings and comprising an upper member with distribution orifices and a threaded stem.

15. The system of claim 14 wherein each of said threaded stems extends through a respective one of said gas chambers and into the respective compensating chamber of each of said laterals, each of said threaded stems comprising at least one orifice for entry of gas during said cleansing period and an entrance for entry of backwash liquid during said cleansing periods, whereupon the position of said entrances are adjustable by rotating said threaded stem.

16. The system of claim 15 wherein each of said threaded stems comprises at least one insert positioned within each of said threaded stems adjacent said at least one orifice to reduce backwash liquid pressure at said at least one orifice for greater gas flow.

17. The system of claim 2 wherein said purification media comprises a layer of granular material above a layer of gravel.

18. The system of claim 2 wherein said liquid comprises waste water.

19. An underdrain lateral for a system which purifies liquid utilizing a purification media, said underdrain lateral comprising:
  (a) a means to introduce a gas into said underdrain lateral to cleanse a liquid purification media during cleansing periods;
  (b) a means to introduce backwash liquid into said underdrain lateral to cleanse said purification media during said cleansing periods;
  (c) a gas chamber defined by surrounding walls;
  (d) a means to provide that only said gas occupies said gas chamber during said cleansing periods; and
  (e) a means to compensate for differences in said liquid and backwash liquid pressures and flow during purification periods and said cleansing periods between said lateral and at least one other underdrain lateral.

20. An underdrain lateral which purifies liquid utilizing a purification media, said underdrain lateral comprising:
  (a) a means to introduce a gas into said underdrain lateral to cleanse a liquid purification media;
  (b) a means to introduce backwash liquid into said underdrain lateral to cleanse said purification media;
  (c) a means to isolate said gas from said liquid and from said backwash liquid;
  (d) a means to compensate for differences between the pressure and flow of said liquid and the pressure and flow of said backwash liquid during purification periods and said cleansing periods between said lateral and at least one other underdrain lateral; and
  (e) a lower primary chamber, a middle compensating chamber above said lower primary chamber and an upper gas chamber above said compensating chamber.

21. The underdrain lateral of claim 20 wherein said means to introduce gas into said underdrain lateral comprises at least one gas inlet pipe which feeds gas into said upper gas chamber and said means to introduce said backwash liquid into said underdrain lateral comprises a liquid flume which feeds backwash water into said lower primary chamber.

22. The underdrain lateral of claim 21 wherein said mean to isolate said gas from said liquid and backwash liquid comprises said upper gas chamber and said at least one gas inlet pipe which feeds said gas into said upper gas chamber, said gas chamber being occupied only with gas when said gas is introduced into said underdrain lateral.

23. The underdrain lateral of claim 20 wherein said underdrain lateral comprises a separator wall between said lower primary chamber and said middle compensating chamber and a horizontal baffle between said middle compensating chamber, and said upper gas chamber and said means to compensate for differences in said liquid and backwash liquid pressures and flow comprises orifices in said separator wall and in said horizontal baffle.

24. The underdrain lateral of claim 20 wherein said underdrain lateral comprises means to equalize the distribution of said liquid and said backwash liquid throughout said liquid 25. The underdrain lateral of claim 24 wherein said liquid purification system comprises a bed with a plurality of said underdrain laterals laid across said bed beneath said purification media, each of said plurality of underdrain laterals being parallel.

26. The underdrain lateral of claim 25 wherein said means to equalize the distribution of said liquid and said backwash liquid comprises at least one cut-out in each of said primary chambers of said plurality of said underdrain laterals allowing said liquid to flow between said primary chambers.

27. The underdrain lateral of claim 20 wherein said underdrain lateral comprises a means to equalize the distribution of gas throughout said liquid purification system.

28. The underdrain lateral of claim 20 wherein said liquid purification system comprises a bed with a plurality of said underdrain laterals laid across said bed beneath said purification media, each of said plurality of said underdrain laterals in parallel abutment to another one of said plurality of said underdrain laterals.

29. The underdrain lateral of claim 28 wherein said means to equalize the distribution of said gas comprises at least one cut-out in each of said gas chambers of said plurality of said underdrain laterals allowing said gas to flow between each of said gas chambers.

30. The underdrain lateral of claim 20 wherein said underdrain lateral comprises a top wall with a plurality of through which said gas and backwash liquid flow during cleansing.

31. The underdrain lateral of claim 30 wherein said underdrain lateral comprises a plurality of nozzle assemblies, each of said plurality of nozzle assemblies being positioned in a respective one of said openings and comprising an upper member and a threaded stem.

32. The underdrain lateral of claim 31 wherein said threaded stem extends through said gas chamber and into said compensating chamber, said threaded stems comprising at least one orifice for the entry of gas and an entrance for the entry of backwash liquid, whereupon the positions of said entrances may be adjusted by rotating said threaded stem.

33. The underdrain lateral of claim 32 wherein said threaded stems comprise at least one insert positioned within said threaded stem adjacent said at least one orifice to reduce liquid pressure at said at least one orifice for greater gas flow.

34. The underdrain lateral of claim 20 wherein said underdrain lateral comprises fiberglass formed by a protrusion process.

35. The underdrain lateral of claim 20 wherein said underdrain lateral comprises a lower compensating chamber, middle primary chamber above said lower compensating chamber and a upper gas chamber above said primary chamber.

36. The underdrain lateral of claim 35 wherein said means to introduce gas into said underdrain lateral comprises at least one gas inlet pipe which feeds gas into said upper gas chamber and said means to introduce said backwash liquid into said underdrain lateral comprises a liquid flume which feeds backwash water into said lower primary chamber.

37. The underdrain lateral of claim 36 wherein said means to isolate said gas from said liquid and backwash liquid comprises said upper gas chamber and said at least one gas inlet pipe which feeds said gas into said upper gas chamber, said gas chamber being occupied only with gas when said gas is introduced into said underdrain lateral.

38. The underdrain lateral of claim 35 wherein said underdrain lateral comprises a separator wall between said lower compensating chamber and said middle primary chamber and a horizontal baffle between said middle primary chamber and said upper gas chamber and said means to compensate for differences in said liquid and backwash liquid pressures and flow comprises orifices in said separator wall and in said horizontal baffle.

39. The underdrain lateral of claim 35 wherein said underdrain lateral comprises means to equalize the distribution of said liquid and said backwash liquid throughout said liquid purification system.

40. The underdrain lateral of claim 39 wherein said liquid purification system comprises a bed with a plurality of said underdrain laterals laid across said bed beneath said purification media, each of said plurality of laterals being parallel.

41. The underdrain lateral of claim 40 wherein said means to equalize the distribution of said liquid and said backwash liquid comprises at least one cut-out in each of said primary chambers of said plurality of said underdrain laterals allowing said liquid to flow between said primary chambers.

42. The underdrain lateral of claim 35 wherein said underdrain lateral comprises a means to equalize the distribution of gas throughout said liquid purification system.

43. The underdrain lateral of claim 42 wherein said liquid purification system comprises a bed with a plurality of said underdrain laterals laid across said bed beneath said purification media, each of said plurality of said underdrain laterals being parallel.

44. The underdrain lateral of claim 43 wherein said means to equalize the distribution of said gas comprises at least one cut-out in each of said gas chambers of said plurality of said underdrain laterals allowing said gas to flow between each of said gas chambers.

45. The underdrain lateral of claim 35 wherein said underdrain lateral comprises a top wall with a plurality of openings through which said liquid flows during purification and through which said gas and backwash liquid flow during cleansing.

46. The underdrain lateral of claim 45 wherein said underdrain lateral comprises a plurality of nozzle assemblies, each of said plurality of nozzle assemblies being positioned in a respective one of said openings and comprising an upper member and a threaded stem.

47. The underdrain lateral of claim 46 wherein each of said threaded stems extends through said gas chamber and said primary chamber, into said compensating chamber, each of said threaded stems comprising of at least one orifice and entrance for the entry of backwash liquid whereupon the position of said entrance is adjustable by rotating said threaded stem.

48. The underdrain lateral of claim 47 wherein each of said threaded stems comprises at least one insert, positioned within each of said threaded stems adjacent said at least one orifice to reduce liquid pressure at said at least one orifice for greater gas flow.

49. A liquid purification system comprising:
(a) a bed into which a liquid to be purified flows;
(b) a liquid purification media located in said bed which purifies liquid during purification periods;

(c) an underdrain placed in said bed beneath said purification media, said underdrain comprising a plurality of underdrain laterals laid laterally in said bed, each of said plurality of laterals being parallel;
  (1) a means to cleanse said purification media during cleansing periods using gas and backwash liquid introduced into said underdrain;
  (2) a means to isolate said gas from said liquid and said backwash liquid when said gas is introduced into said underdrain, by allowing only said gas to occupy a portion of each of said laterals during cleansing periods;
  (3) a means to compensate for differences in said liquid pressures and flow during said purification periods and during said cleansing periods between said laterals; and
  (4) a lower compensating chamber a middle primary chamber above said lower compensating chamber and an upper gas chamber above said primary chamber, and said means to isolate said gas from said liquid and backwash liquid comprises each of said gas chambers into which said gas is introduced during cleansing of said purification media, with said gas chamber occupied only with gas during said cleansing periods.

50. The system of claim 49, wherein said means to cleanse said purification media comprises a means to introduce said gas into each of said gas chambers to loosen impure matter adhering to said purification media as a result of said purification and a means to introduce said backwash liquid into each of said primary chambers to remove said impure matter from said bed.

51. The system of claim 50, wherein said means to introduce gas into said gas chambers comprises at least one gas inlet pipe and said means to introduce said backwash liquid into said primary chambers comprises a liquid flume.

52. The system of claim 49, wherein each of said plurality of underdrain laterals comprises a separator wall between each of said primary chambers and a respective one of said compensating chambers and said means to compensate for differences in liquid pressures and flow during purification and cleansing comprises orifices in said separator walls.

53. The system of claim 49 wherein said system comprises a means to minimize liquid turbulence during said cleansing periods of said purification media.

54. The system of claim 53 wherein each of said plurality of underdrain laterals comprises a horizontal baffle between each of said primary chambers and a respective one of said gas chambers, and said means to minimize liquid turbulence comprises each of said baffles, said baffles being positioned a predetermined position above the interface between said gas and liquid during said cleansing periods of said purification media to minimize liquid standing waves and turbulence during said cleansing periods.

55. The system of claim 54 wherein each of said baffles has orifices therein to compensate for differences in liquid pressures and flows during said purification periods and during cleansing periods.

56. The system of claim 49 wherein said system comprises a means to equalize liquid distribution and backwash liquid distribution in said underdrain.

57. The system of claim 56 wherein said means to equalize liquid distribution and backwash liquid distribution comprises at least one cutout in each of said primary chambers allowing said liquids to flow between said primary chambers.

58. The system of claim 57 wherein said system comprises a means to equalize gas distribution in said underdrain.

59. The system of claim 58 wherein said means to equalize gas distribution in said underdrain comprises cutouts in each of said gas chambers allowing said gas to flow between said gas chambers.

60. The system of claim 49 wherein each of said plurality of underdrain laterals comprises a top wall with a plurality of openings through which said liquid flows during purification and through which said gas and backwash liquids flow during cleansing.

61. The system of claim 50 wherein each of said plurality of underdrains comprises a plurality of nozzle assemblies, each of said plurality of nozzle assemblies being positioned in a respective one of said plurality of openings and comprising an upper member with distribution orifices and a threaded stem.

62. The system of claim 61 wherein each of said threaded stems extends through a respective one of said gas chambers and through the respective one of said primary chambers, and into the respective one of said compensating chambers, said threaded stem comprising at least one orifice for the entry of gas during cleansing periods and an entrance for entry of backwash liquid during cleansing periods, whereupon when said threaded stems are rotated, the position of said entrances in said compensating chamber are variable.

63. The system of claim 62 wherein each of said threaded stems comprises at least one insert positioned within each of said threaded stems adjacent said at least one orifice to reduce backwash liquid pressure at said at least one orifice for greater gas flow.

64. The system of claim 49 wherein said purification media comprises a layer of granular material above at least one layer of gravel.

65. The system of claim 49 wherein said liquid comprises waste water.

* * * * *